United States Patent
Price et al.

(10) Patent No.: US 6,718,017 B1
(45) Date of Patent: Apr. 6, 2004

(54) SYSTEM AND METHOD FOR CREATING AND CONTROLLING INTERACTIVE VOICE RESPONSE APPLICATIONS

(75) Inventors: Timothy M. Price, Rockville, MD (US); Nicholas K. Unger, Vienna, VA (US); David E. Markle, McLean, VA (US); John R. Ramsay, Herndon, VA (US); Joshua T. Gray, Reston, VA (US)

(73) Assignee: Convergys Customer Management Group, Inc., Cincinnati, OH (US)

(*) Notice: Subject to any disclaimer, the term of this patent is extended or adjusted under 35 U.S.C. 154(b) by 0 days.

(21) Appl. No.: 09/288,677

(22) Filed: Apr. 9, 1999

(51) Int. Cl.⁷ .............................................. H04M 1/65
(52) U.S. Cl. ........................... 379/88.22; 379/88.17; 379/201.03
(58) Field of Search ...................... 379/67.1, 76, 88.11, 379/88.16, 88.17, 88.22, 88.23, 201.01, 201.03

(56) References Cited

U.S. PATENT DOCUMENTS

| | | | | |
|---|---|---|---|---|
| 4,320,256 A | * | 3/1982 | Freeman ...................... | 379/73 |
| 4,355,372 A | * | 10/1982 | Johnson et al. ............ | 379/92.04 |
| 4,446,336 A | | 5/1984 | Bethel et al. ................ | 179/6.1 |
| 4,603,232 A | * | 7/1986 | Kurland et al. ............ | 379/92.04 |
| 4,782,517 A | | 11/1988 | Bernardis et al. ............ | 379/201 |
| 4,785,408 A | * | 11/1988 | Britton et al. ............... | 704/270 |
| 4,922,520 A | * | 5/1990 | Bernard et al. .............. | 379/88 |
| 5,136,634 A | | 8/1992 | Rae et al. ..................... | 379/100 |
| 5,187,735 A | | 2/1993 | Herrero Garcia et al. ..... | 379/88 |
| 5,488,650 A | * | 1/1996 | Greco et al. .................. | 379/67 |
| 5,493,608 A | * | 2/1996 | O'Sullivan ................... | 379/88 |
| 5,577,041 A | | 11/1996 | Sharma et al. ................ | 370/79 |
| 5,646,981 A | | 7/1997 | Klein ........................... | 379/67 |
| 5,664,110 A | | 9/1997 | Green et al. .................. | 705/26 |
| 5,682,421 A | | 10/1997 | Glovitz et al. ................ | 379/97 |
| 5,701,419 A | | 12/1997 | McConnell ................... | 395/227 |
| 5,727,046 A | | 3/1998 | Almulla ....................... | 379/88 |
| 5,737,393 A | * | 4/1998 | Wolf ............................. | 379/67 |
| 5,771,276 A | | 6/1998 | Wolf ............................. | 379/88 |
| 5,945,989 A | * | 8/1999 | Freishtat et al. ............. | 345/760 |
| 6,014,647 A | * | 1/2000 | Nizzari et al. ................ | 705/39 |
| 6,122,345 A | * | 9/2000 | Johnson ...................... | 379/67.1 |
| 6,272,115 B1 | * | 8/2001 | Elliott, III .................... | 370/259 |
| 6,370,238 B1 | * | 4/2002 | Sansone et al. .............. | 379/71 |
| 2001/0014146 A1 | * | 8/2001 | Beyda et al. ............. | 379/88.25 |

* cited by examiner

*Primary Examiner*—Scott L. Weaver
(74) *Attorney, Agent, or Firm*—Frost Brown Todd LLC

(57) ABSTRACT

A system and method allows a customer company to create, modify and control interactive voice response (IVR) applications from a remote location. In one embodiment, a first IVR application is used to develop, modify and/or control a second IVR application. The first IVR application could be accessed by telephone or by computer using any type of data communications network. In alternate embodiments, a customer can use a computer at the customer's location to develop a new IVR application which is then downloaded to an IVR service provider's equipment. Alternatively, a customer could use a computer to access an IVR system, and a graphical or audio/graphical interface can be used to develop a new IVR application, or to modify and/or control pre-existing IVR applications.

16 Claims, 6 Drawing Sheets

SYSTEM AND METHOD FOR CREATING AND CONTROLLING INTERACTIVE VOICE RESPONSE APPLICATIONS

BACKGROUND OF THE INVENTION

1. Field of the Invention

The invention relates to systems and methods for creating and controlling interactive voice response applications that are commonly accessed using a telephone.

2. Background of the Related Art

Interactive voice response (IVR) applications are typically offered through a telephone network. A user dials a telephone number and the system will answer, provide an audible voice greeting, and then list a series of menu choices from which the user can select. The menu choices allow the user to navigate to a particular information area, to talk to a particular customer service representative, or to perform various tasks. Selecting one of the choices from the initial menu may lead to additional menus which have further choices. These systems are automated so that no telephone operator or customer service representative is needed to answer calls, or to direct callers to appropriate locations.

IVR applications can be used to allow a caller to access prerecorded information, or to access the current status of variable information, such as financial account balances. In this case, the IVR application may include the ability to access information stored in another computer, and the ability to create audio sounds listing the accessed information. Such an IVR application may also allow a user to input information necessary to access such information.

Generally, when a caller must enter information, the caller is asked to enter the information using the telephone keypad. The user's telephone set will generate dual tone multifrequency (DTMF) tones corresponding to each depressed key. The IVR application receives the DTMF tones and interprets the tones based on the requested information it expects to receive. In more advanced IVR applications, a customer can provide a spoken response, which is then interpreted using voice recognition techniques.

Some IVR applications are used to record information provided by a user. The user is asked to enter the information using a keypad, or is requested to speak a response. The input information or spoken response is then recorded for later use by a company or live operator.

When a company wishes to provide an IVR application, they can either purchase the necessary equipment themselves, and program their own application, or they can hire an IVR service provider. The service provider will determine the needs of the customer and will develop an IVR application tailored to the customer's needs. The service provider will then load the IVR application into its equipment and provide the actual IVR service to callers. In some instances, the customer may have its own telephone equipment capable of running an IVR application developed by the service provider. However, when an IVR service provider is hired to develop an application, it is more common for the service provider to own and run all the computer and telephone equipment associated with providing the IVR service.

Once an IVR application is in operation, a variety of control functions can be performed. The IVR application can be selectively activated/deactivated. Usage reports can be generated to list user calls, and possibly information input by user callers. Also, an existing IVR application can be updated to reflect changing conditions. This could include replacing old voice prompts with new voice prompts, or modifying one or more menus and operations performed by the IVR application. All these control functions are usually performed by personnel at the IVR service provider's facility.

In some instances, an IVR service provider may provide a customer with the capability to record new voice prompts, or perform limited control functions on their IVR applications via a separate IVR application. However, it is more common for the customer to simply contact the IVR service provider and request that the changes be made.

Thus, in the typical situation, a customer company must pay the service provider to develop an IVR application, and then pay to maintain, run and modify the service so that users who call and utilize the service are always provided with updated information.

SUMMARY OF THE INVENTION

The invention is a system and method which allows a customer company to independently develop and control their own IVR applications without directly engaging a programmer at the service provider's facility.

In one preferred embodiment, a system and method embodying the invention utilizes an IVR application which a customer company can call and utilize to develop their own individually tailored IVR application. This means that a first IVR application is used to develop a new second IVR application.

In another preferred embodiment, a system and method embodying the invention would utilize a first IVR application that can be called by a customer company and used to control a second pre-existing IVR application. Thus, a first IVR application would be used to control the functions of a second IVR application.

In the embodiments described above, a customer company could make a telephone call to the service provider's facility and access an IVR application. The customer could respond to menu choices of the IVR application by pressing keys of a telephone keypad, or by speaking oral responses. The IVR application would receive and interpret the responses to generate a new IVR application or to control a pre-existing IVR application.

In other embodiments of the invention, a computer at the customer company's location could run software that enables the customer to develop a new IVR application. The customer computer could then download the new IVR application to an IVR service provider's equipment, and activate the new IVR application. Similarly, the customer computer could be used to remotely control an IVR application running on a service provider's equipment. The communications between the customer computer and the IVR service provider's equipment could be implemented by modem (through the telephone network), or by using a computer network connection.

In yet another alternate embodiment, a customer's computer can be configured to communicate with an IVR system using a graphical or audio/graphical interface. For instance, a customer computer could be used to access a web site maintained by the IVR service provider. Interactions between the customer computer and the IVR system could then be used to develop a new IVR application, or to control a pre-existing IVR application.

In each of the above-described alternate embodiments, the customer's computer could have sound recording capabilities which would enable the customer company to record its own voice prompts which are used in the IVR applications.

As described above, in systems and methods embodying the invention, an IVR application, or a computer at the customer's facility, could be used to exert control over a pre-existing IVR application. These control functions could include activating and/or de-activating an IVR application; modifying a pre-existing application; replacing existing voice prompts of an IVR application with new voice prompts; requesting usage reports or information reports regarding an existing IVR application; and requesting playback of recorded user responses that were given by users who accessed an IVR application. Additional control functions associated with IVR applications could also be performed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

A detailed description of preferred embodiments of the present invention will be described in conjunction with the following drawing figures, wherein like reference numerals refer to like elements, and wherein.

DETAILED DESCRIPTION OF PREFERRED EMBODIMENTS

Certain terms appearing in the specification and the claims are defined as explained below.

The term "service provider" will refer to a company or system that provides IVR capabilities to customer companies. The "service provider" typically develops IVR applications for customer companies, and maintains and runs equipment upon which the IVR applications are run.

The term "customer" or "customer company" will refer to companies or individuals that request the development of IVR applications, or that operate IVR applications as part of their business.

The term "user" will refer to people who access and use IVR applications to obtain information or services from customer companies.

The term "communications network" could include any type of communications or data transfer medium. A "communications network" could be a telephone network, a computer data network such as a local area network or a wide area network, and could include larger global networks such as the internet. A "communications network" could also include any type of system for exchanging analog or digital data using electronic or optical signals. This could include systems that utilize electromagnetic radiation such as radio frequency communications, infrared communications, and any other type of satellite or point-to-point communications systems.

The structure of an IVR application can be mapped out graphically to show the different menu choices of an application, and how one menu choice may lead to additional menu choices. Such a chart resembles a genealogy chart. Each set of choices that a user must select from will hereafter be referred to as a "node." A node could also comprise a request for information input by the user, followed by a recording of the user input.

Typically, a single "voice prompt" will list all of the user's choices for a particular node of an application. Thus, a different voice prompt is provided for each node.

Figure 1:
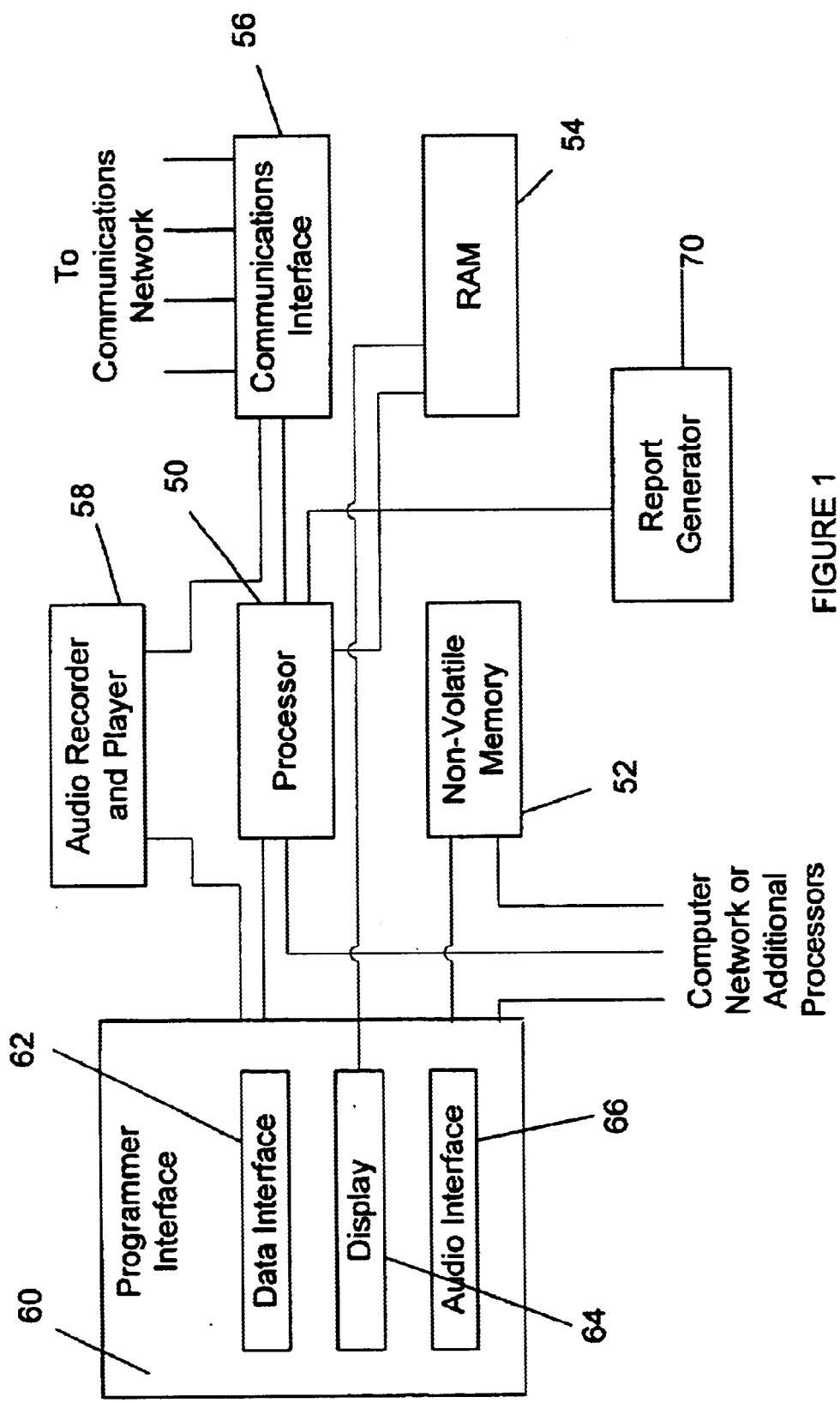
FIG. 1 is a functional block diagram of an IVR application system.

An IVR application can be developed and run using a system as shown in FIG. 1. The system includes a processor 50 which is connected to non-volatile memory 52 and volatile or RAM memory 54. The processor runs software, which can be stored in the non-volatile memory 52, to implement an IVR application. The processor 50 communicates with callers via a communications interface 56.

The voice prompts of an IVR application can be stored and replayed in various different ways. Voice prompts could be recorded in a digital format in the non-volatile memory 52. The voice prompts could then be accessed and played to a calling user by the processor 50 through the communications interface 56.

Alternatively, the system could include an audio recorder and player 58. The audio recorder and player could comprise a separate processor and/or memory storage device which records voice prompts in a digital format. The audio recorder and player 58 might also be capable of reproducing voice prompts or audio sounds from the recorded digital signals. In another alternate embodiment, the audio recorder and player 58 could record and play back voice prompts or sounds using an analog recording method, as is often done using magnetic storage media.

Both the non-volatile memory device 52 and portions of the audio recorder and player 58 could be configured to record and retrieve audio sounds and voice prompts in a digital format using magnetic storage media such as disks and tapes, EPROMS, EEPROMS, flash memories, optical storage media such as compact disks and optical tapes, or any other type of digital data recording medium. The non-volatile memory device 52 and portions of the audio recorder and player 58 could also be configured to record and playback audio sounds and voice prompts using analog techniques.

The communications interface 56 could communicate with users of an IVR application via a telephone network, a computer network, or the internet. The communications interface could also be used to communicate with users over any other type of communications network, as described above.

The system shown in FIG. 1 could also include a programmer interface 60 which is connected to the processor 50, the non-volatile memory 52, the RAM 54, and the audio recorder and player 58. The programmer interface could include a separate computer system including its own processor, a data interface 62, a display 64 and an audio interface 66.

The programmer interface 60 would allow a programmer at a service provider's facility to develop new IVR applications, and to modify and control pre-existing IVR applications. A programmer would use the programmer interface 60 to create computer code which could then be run by the processor 50 to implement an IVR application. The programmer interface 60 could also be used to activate and de-activate applications, to modify applications, to replace voice prompts of pre-existing applications with new voice prompts, to request reports of user usage of an IVR application, or to access and play back recorded user responses given during the use of an IVR application.

The system shown in FIG. 1 could also include a report generator 70, which can be used to generate various reports relating to an IVR application. For instance, the report generator 70 could include software, and a separate processor that is capable of accessing recorded information relating to an IVR application. The report generator could review the recorded information and generate various reports regarding usage of an IVR application. Similarly, the report generator 70 may be configured to provide reports, transcriptions, or playback of recorded user messages that were given by users of an IVR application. The report generator 70 may include a printer or other information output device for outputting such information.

The report generator 70 may also include a separate database of recorded user responses. Such a database would be updated as users access and utilize an IVR application. The report generator 70 would then be configured to collate and summarize such user provided information and to provide reports in an easily understandable format.

Figure 2:
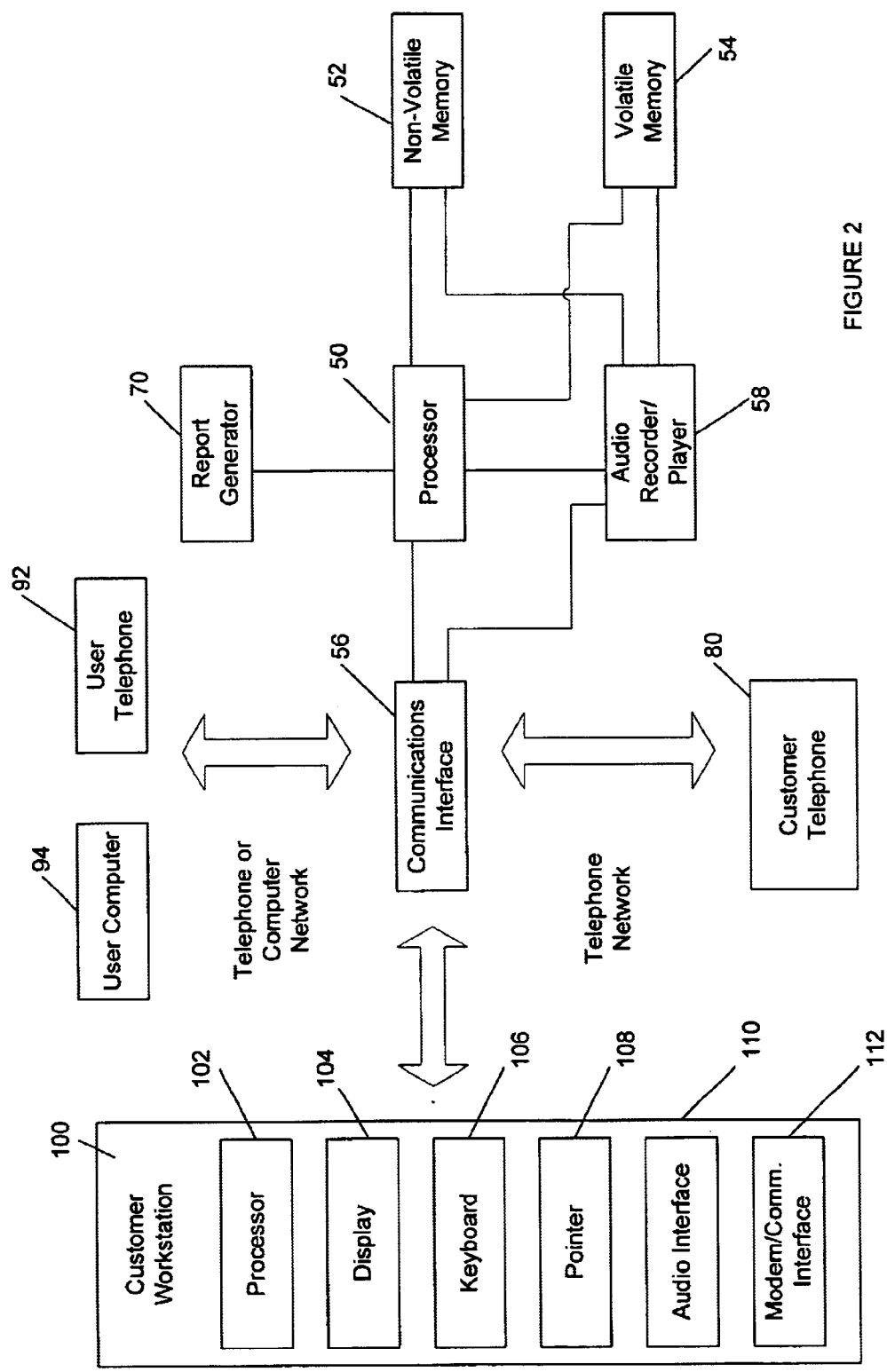
FIG. 2 is a functional block diagram illustrating how an IVR system embodying the invention interfaces with a customer, users and a computer located at a customer's location.

FIG. 2 shows an IVR system, similar to the one in FIG. 1, and how the system interacts with a user's telephone, a user's computer, customer company's telephone, or a computer located at the customer's facility. The system that actually runs an IVR application includes a processor 50, non-volatile memory 52, volatile memory 54, and an audio recorder/player 58. The processor is connected to a communications interface 56, which may also be connected to the audio recorder/player 58.

Of course, a system capable of implementing and IVR application need not include all the elements shown in FIGS. 1 and 2. For instance, the audio player/recorder 58 may or may not be used. Similarly, the report generator 70 is not necessary to provide an IVR application. Also, various types of memory devices may or may not be used with a particular IVR system.

As described above in connection with FIG. 1, the software for implementing an IVR application would typically be stored in the non-volatile memory 52, and the software would be run by the processor 50. The processor would provide an IVR application to users, and to a customer company, through the communications interface 56. Voice prompts for an IVR application would be stored either in the non-volatile memory 52, or in the audio recorder/player 58. Also, responses from users of the IVR application could be recorded by the application in the audio recorder/player, and/or in the non-volatile memory 52, and/or in the report generator 70.

The communications interface 56 would allow the system to communicate with a user, and possibly also with a customer company. The communications interface could be designed to effect communications through a telephone network, a computer network, the internet, or any other type of audio or digital communications network.

When a user wants to access an IVR application, the user would either call a telephone number and communicate with the IVR application through a user telephone 92, or access the IVR application via a user computer 94. If access is achieved through a user's computer 94, the communications network connecting the user computer to the communications interface 56 of the IVR system could be a modem and telephone network, a computer network, or a wireless communications link. The user computer 94 could directly access the processor 50 of the IVR system, or an internet web site could be used as an interface for communicating with the processor 50 of the IVR system.

If access is by user telephone 92, the IVR application would then present the user with various menu choices through the communications interface 56 and the user's telephone 92. The user would then press keys of a key pad of the user telephone 92, or the user could simply speak oral responses.

When the user responds by pressing keys of a telephone key pad, the user telephone 92 would generate DTMF signals which would be communicated through the telephone network and to the system via the communications interface 56. The processor 50 could then receive the DTMF signals and interpret them to determine which option the user selected from a particular menu.

If the user speaks oral responses, the oral response would be communicated to the system through the telephone network and the communications interface 56. The processor 50 would then use voice recognition techniques to determine which option a user selected from a particular menu. A user might also communicate oral responses to the system using audio capabilities of a user computer 94.

Also, if the user provides certain information which is to be recorded by the IVR application, the information could be in the form of depressed keys of a telephone key pad, or spoken oral information. In either case, the provided information could be recorded in either a digital or an analog format using either the non-volatile memory 52 or the audio recorder/player 58. Such recordings of user responses could then be provided to a customer company for various purposes.

If a user accesses an IVR application through a user computer 94, the IVR application could instruct the computer to display menu choices on a display screen of the user computer 94. Alternatively, sound capabilities of the user's computer 94 could be utilized to provide audio prompts, or such prompts could be provided with text and graphics appearing on a display screen. The user could respond to the IVR application, either to make a menu selection or to provide information for recording, by pressing keys of a keyboard of the user computer 94, by making a selection with a pointing device such as a mouse, a trackball or a joystick, or by speaking oral responses that the user computer transmits to the IVR system. If a customer is requesting information through the IVR system, the IVR system could transmit such data in various formats, and the transmitted data could be displayed, played and/or recorded by the user's computer 94.

In a system embodying the present invention, a customer company could use a customer telephone 80 or a customer workstation 100 to communicate with the IVR system to develop a new IVR application, or to control a pre-existing application. The customer telephone 80 or the customer workstation 100 could be located anywhere, including at a customer's facility, and would communicate with the IVR system via a telephone network, a computer network, or some other communications network.

In one embodiment of the present invention, a customer would access the IVR system through a customer telephone 80 or a customer workstation 100 to generate a new IVR application. An automated interrogation system would present the customer with a series of menu choices, such as voice prompts of a typical IVR application, which would allow the customer to define the framework of the new IVR application. In the case of a customer computer, the system could communicate with the customer using a graphical or an audio/graphical interface presented on the customer workstation 100 to define the new IVR application. The customer may also be able to record voice prompts which are used by the new IVR application.

An embodiment of the invention may also allow the customer company to control a newly developed or a pre-existing IVR application through a customer telephone 80 or customer workstation 100. This could be done by presenting the customer with a series of audio menu choices, as in a typical IVR application, or by communicating with the customer using a graphical or an audio/graphical interface presented on the customer workstation 100. The customer would select the appropriate control functions, and carry out those functions or request reports.

One example of a control function that could be performed by a customer would be the activation or de-activation of a pre-existing IVR application. A customer company might also be able to access the IVR system to modify the structure of a pre-existing IVR application, and/or to replace pre-existing voice prompts of an IVR application with new voice prompts. A customer might also request reports of user usage of an IVR application, or transcription/playback of recorded user responses. Other additional control functions could also be performed remotely by the customer.

In an embodiment where the customer communicates with the IVR system using a customer workstation 100, the customer workstation 100 could include a processor 102, a display 104, a keyboard 106, a pointing device 108 (such as a mouse, a track ball or a joy stick), an audio interface 110 and a modem or a communications interface 112. Alternate embodiments of the customer workstation 100 may include fewer than all these features, or additional features.

In one alternate embodiment of the invention, a customer workstation 100 could run software which would enable the customer to develop a new IVR application using his customer workstation 100, without interaction with an IVR system. The customer could then download the newly created IVR application to the service provider's facility using a communications network. This could include downloading digital and/or analog audio data to the service provider's facility using a modem and a telephone network, using a computer network, or using any other type of communications network.

In the embodiment described immediately above, a new IVR application is developed independently of the service provider's equipment, and the new application is then downloaded to the service provider's equipment. At this point, the customer company could use a customer telephone 80 or a customer workstation 100 to activate the new application, and to accomplish various control functions, as described above.

In a different embodiment of the invention, the customer workstation 100 could be used to access a website on the internet which is maintained by the service provider, or a graphical or audio/graphical interface. By interacting with the IVR service provider's system, the customer company could develop a new interactive voice response application. In this instance, the customer could be presented with menu options that appear on the display 104 of the customer's workstation 100, and/or the customer could be presented with a menu of choices using audio capabilities of an audio interface 110 of the customer's workstation 100. The customer could then use his keyboard 106 or a pointer 108, or he could speak responses that are captured and interpreted by the audio interface 110 to select menu options as part of the process of developing the new IVR application. Thus, by accessing such a website or interface, and responding to questions or choices, a customer would be able to develop a new IVR application. This could also include recording voice prompts for the application using the sound recording capabilities of the customer's work station 100.

A customer company could also use a customer workstation to access a website maintained by the service provider, or to access a graphical or audio/graphical interface, to perform various control functions on an IVR application that is run by the service provider. For instance, the customer company could use a customer workstation 100 to activate/de-activate an application, to modify an application, to replace existing voice prompts with new voice prompts, to request reports of user usage, or to access and play back recorded user responses.

FIGS. 3A–3D show a flow diagram of a method embodying the invention that would allow a customer company to develop a new IVR application, to modify existing applications, or to perform various control functions on an existing application. The method shown in FIGS. 3A–3D could be embodied in an IVR application resident at a service provider's facility. Such an IVR application could be accessed and utilized using a telephone, using a computer interface, or using the internet. The method shown in FIGS. 3A–3D could also be implemented as a software interface that allows a customer to communicate with the IVR service through a customer computer or workstation. Thus, the method shown in FIGS. 3A–3D could be entirely implemented in an audio IVR application, or could be implemented in a graphical or audio/graphical application accessible by computer. For purposes of illustration only, the following description will assume that FIGS. 3A–3D describe an IVR application accessible by a customer with a telephone set. This is not to be construed as limiting of the present invention, which also includes systems that are accessible via computer.

Figure 3A:
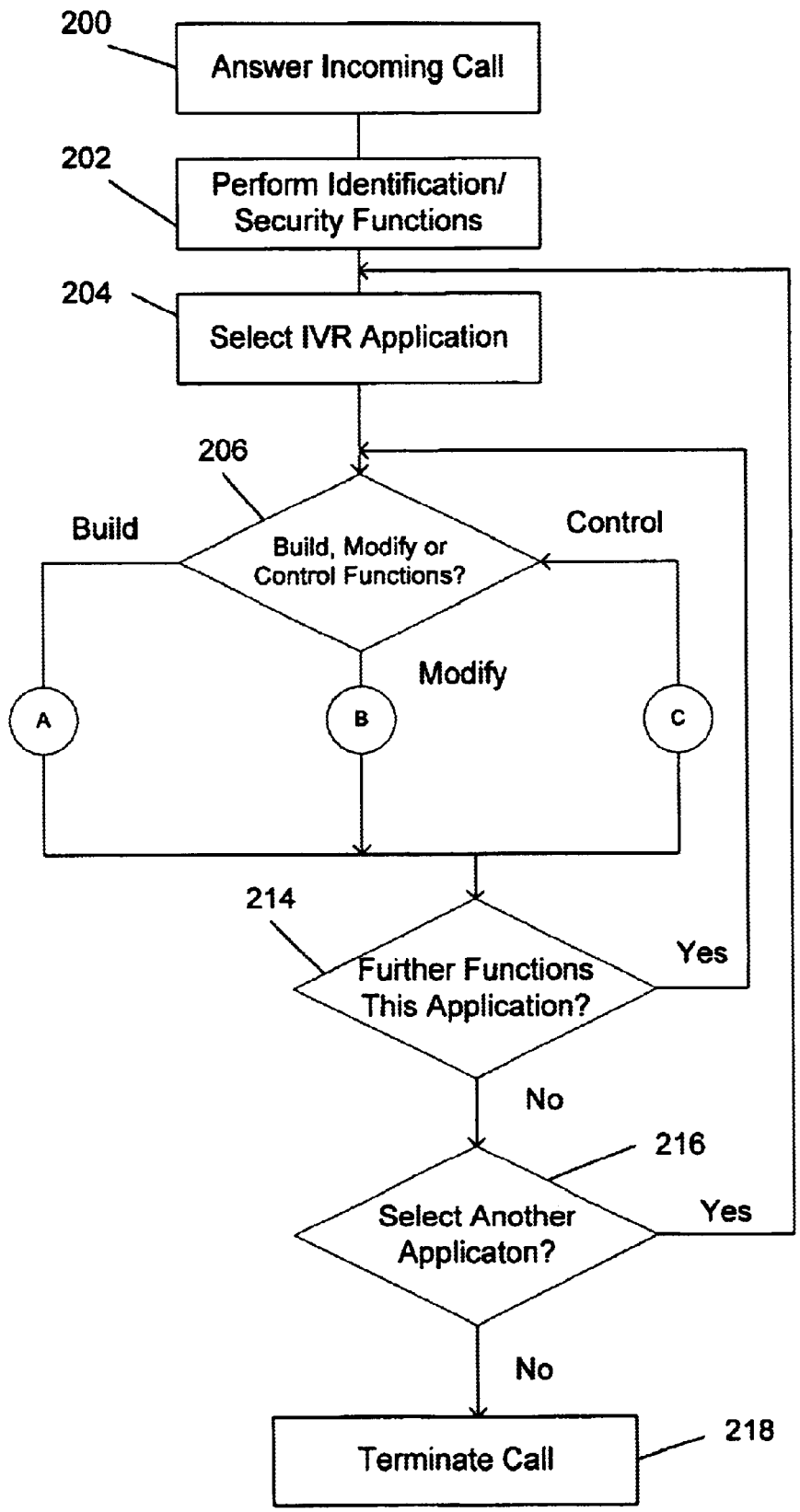
FIG. 3A shows portions of a method embodying the invention.

FIG. 3A shows the basic framework of a method embodying the invention that can be used by a customer to create, modify and control an IVR application. The method starts with step 200, where the system would answer an incoming call from a customer. The method proceeds to step 202, where identification and security functions are performed which would allow an IVR system to identify the calling customer, and to ensure that the customer is authorized to perform certain functions. Next, in step 204, the customer would select an IVR application which is to be created/modified/controlled. In step 206, the customer would be asked to select between build functions, modification functions, or control functions.

Figure 3B:
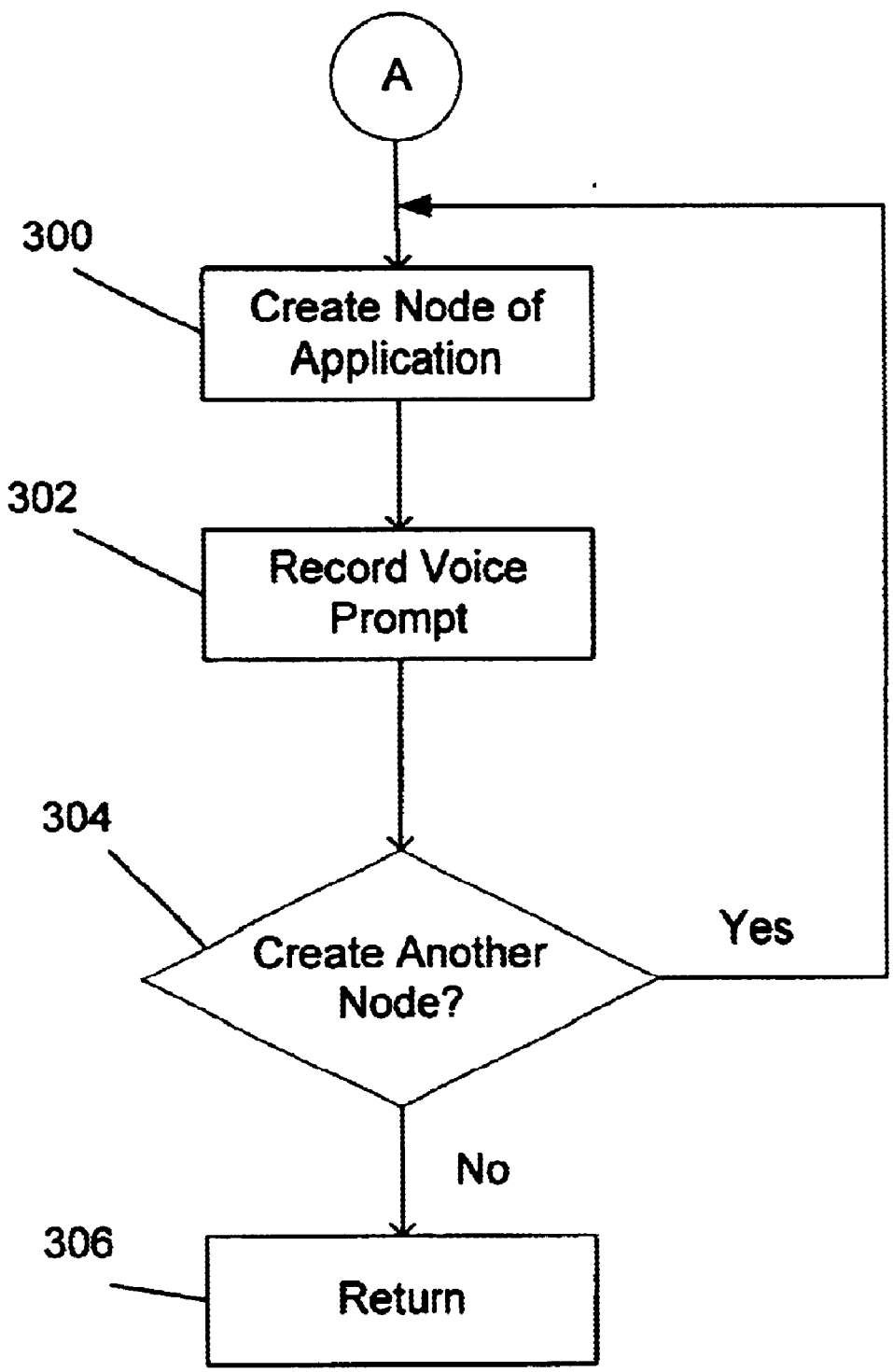
FIG. 3B shows additional portions of the method embodying the invention.
Figure 3C:
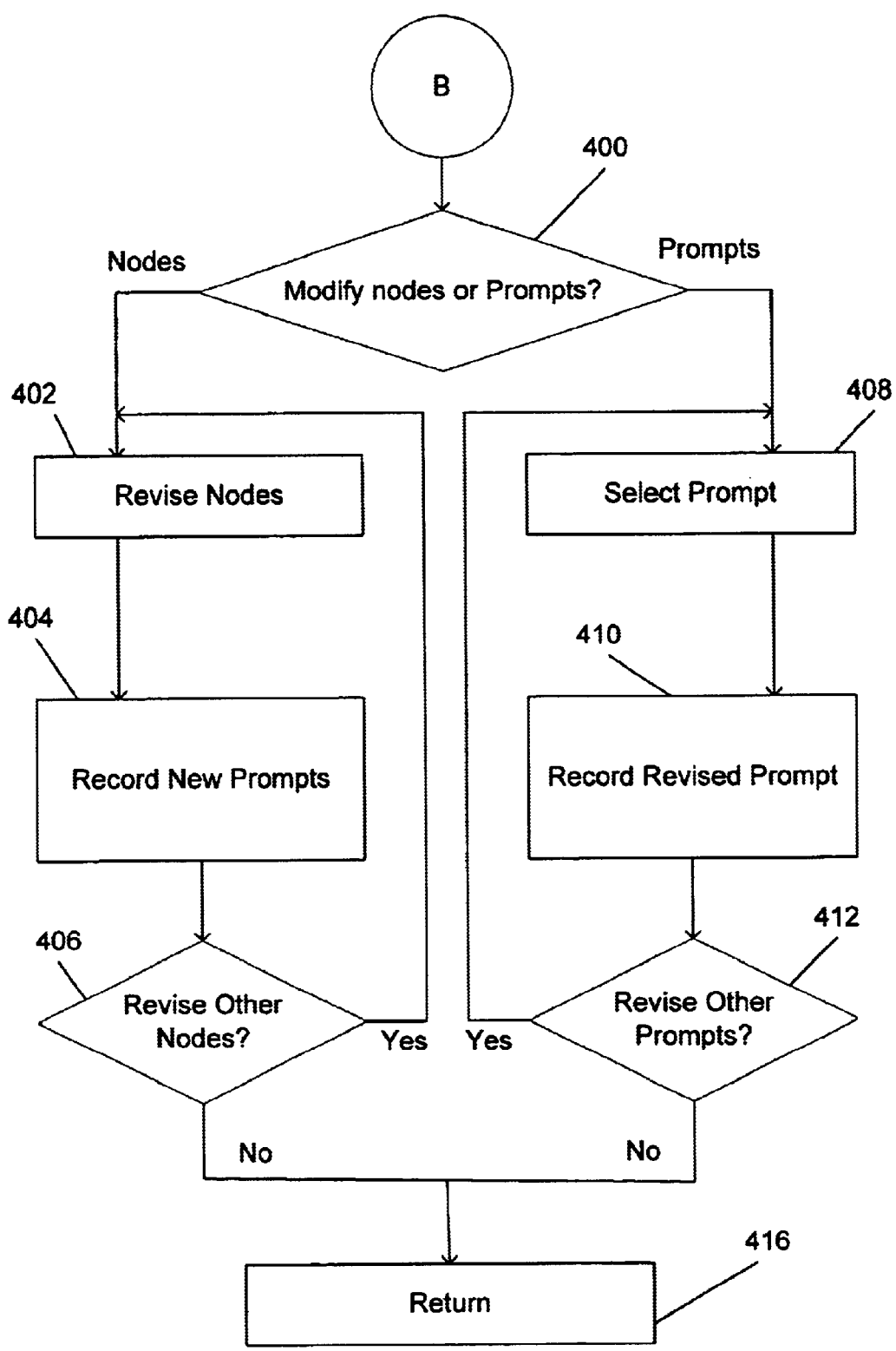
FIG. 3C shows additional portions of the method embodying the invention.
Figure 3D:
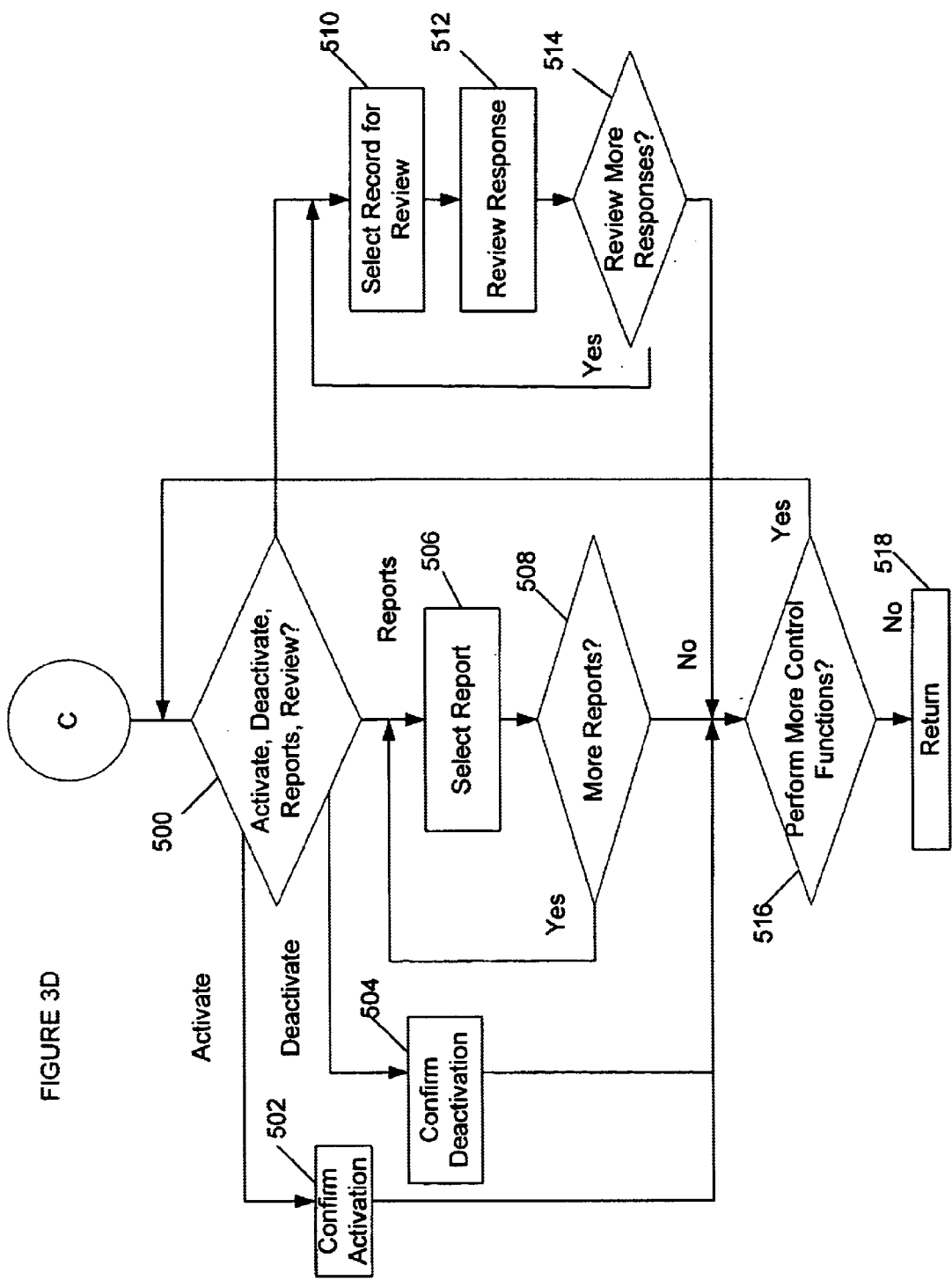
FIG. 3D shows further portions of the method embodying the invention.

If the customer selects build functions, the method would proceed to a series of steps which are shown in FIG. 3B. If the customer selects modification functions, the method would proceed to a series of steps which are shown in FIG. 3C. If the customer selects control functions, the method would proceed to a series of steps that are shown in FIG. 3D.

If the customer selects build functions in step 206, the method would proceed to step 300, shown in FIG. 3B. A series of questions would be posed to the customer, and the customer's responses would be used to create a new node of an IVR application. The customer could then record voice prompts for the node, if necessary, in step 302. Next, the customer would be asked whether he wished to create another node of the new IVR application in step 304. If additional nodes are requested, the method would return to step 300, where an additional node would be created. If no other nodes are required, the method would return, in step 306, to the main portion of the method shown in FIG. 3A.

If the customer selects modification functions in step 206, the method would proceed to step 400, as shown in FIG. 3C. In step 400, the customer would be asked whether he wished to modify nodes of an IVR application, or voice prompts. If a customer selects to modify nodes of an application, the method would proceed to step 402, where the customer would be presented with a series of questions. The customer's responses to the questions would then be used to select and revise a first node of an application. Next, in step 404, the customer could record a new voice prompt for the revised node. The method would proceed to step 406, where the customer would be asked whether additional nodes are to be revised. If so, the method would proceed back to step 402 for additional revision of nodes. If no additional node revision is required, the method would proceed to step 416 and would then return to the main portion of the method shown in FIG. 3A.

If, in step 400, the customer decides to modify existing voice prompts of an IVR application, the method would proceed to step 408. The customer could then respond to questions in step 408 to select a voice prompt for modification. Next, in step 410, the customer could record a new voice prompt to replace an existing voice prompt. In step 412, the customer would then decide whether he wishes to revise additional voice prompts. If additional prompts are to be revised, the method would proceed back to step 408. If no additional prompts are to be revised, the method would return, in step 416, to the main body of the method shown in FIG. 3A.

If, in step 206, the customer decides to perform control functions on an existing IVR application, the method would proceed to step 500, as shown in FIG. 3D. In step 500, the customer would decide to pursue activation functions, deactivation functions, reporting functions or reviewing functions.

If the customer decides to activate the IVR application he previously selected in step 204, the method would proceed to step 502, where the customer would be asked to confirm the activation order. Alternatively, if the customer selects deactivation functions, the method would proceed to step 504, where the customer would be asked to confirm the deactivation order. After either of these actions, the method would proceed to step 516.

If the customer selects reporting functions, the method would proceed to step 506. In this step, the customer would select a report. The method would then proceed to step 508, where the customer would decide whether additional reports are to be selected. If so, the method would return to step 506. If not, the method would proceed to step 516.

If, in step 500, the customer decides to pursue reviewing functions, the method would proceed to step 510. In step 510, the customer would select one or more records, which represent recorded user responses, for review. Then, in step 512, the customer would review the selected responses. The method would proceed to step 514, where the customer would decide whether to review additional responses. If so, the method would return to step 510. If not, the method would proceed to step 516.

In step 516, the customer would decide whether to perform additional control functions. If additional control functions are to be performed, the method would proceed back to step 500. If no additional functions are to be performed, the method would proceed, in step 518, back to the main functions shown in FIG. 3A.

Referring back to FIG. 3A, after the building/modification/control functions have been performed, the method would proceed to step 214, where the customer would be asked whether he wishes to proceed with any additional functions with this first interactive voice response application. If the customer wishes to perform additional functions, the method would return to step 206.

If the customer does not wish to perform any additional functions, the method would proceed to step 216, where the method would ask the customer whether he wishes to select another IVR application. If the customer wishes to select another application, the method would return to step 204. If not, the call would be terminated in step 218.

The foregoing embodiments are merely exemplary and are not to be construed as limiting the present invention. The present teaching can be readily applied to other types of methods and apparatus. The method described is not intended to be limiting and other methods containing fewer or additional steps could also embody the invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although a telephone network and a computer network may not be structural equivalents in that a computer network communicates through digital data transfers, whereas a telephone network can also communicate through analog audio transfers, in the environment of effecting communications between a user or customer and an interactive voice response system, a computer network and a telephone network may be equivalent structures.

What is claimed is:

1. A system for generating an interactive voice response application, comprising:
   a memory device; and
   a processor connected to the memory device and to a communications interface, wherein the processor is configured to pose a series of questions to a customer through the communications interface, wherein the processor is configured to receive customer responses to the series of questions through the communications interface, and wherein the processor is configured to generate a new interactive voice response application based on the customer responses.

2. The system of claim 1, wherein the customer's responses comprise pushing a key of a keypad, wherein response signals indicative of the key pushed by the customer are received by the processor via the communications interface, and wherein the processor is configured to interpret the response signals.

3. The system of claim 1, wherein the customer's responses comprise verbal responses that are received by the processor via the communications interface, and wherein the processor is configured to interpret the verbal responses using voice recognition techniques.

4. The system of claim 1, wherein the processor is also configured to record voice prompts generated by the customer and received through the communications interface, and wherein the processor is configured to integrate the recorded voice prompts into the generated interactive voice response application.

5. The system of claim 1, wherein the customer's responses comprise pushing keys of a customer's telephone, and wherein the processor is configured to interpret DTMF tones generated by the customer's telephone.

6. The system of claim 1, further comprising a sound recording device for recording audio responses from the customer.

7. The system of claim 6, herein the sound recording device is configured to record a customer response as a voice prompt, and wherein the processor is configured to integrate recorded voice prompts into the generated interactive voice response application.

8. The system of claim 1, further comprising a report generator for generating reports of information regarding an interactive voice response application.

9. A method of creating an interactive voice response application, comprising the steps of:

accessing a first interactive voice response (IVR) application;

said first IVR application posing a series of questions to a customer with an automated interrogation system;

said first IVR application receiving the customer' responses to the series of questions;

said first IVR application interpreting the customer's responses; and said first IVR application generating a new interactive voice response application based on the customer responses.

10. The method of claim 9, further comprising the step of recording at least one voice prompt generated by the customer in response to one of the series of questions.

11. The method of claim 10, wherein the step of generating an interactive voice response application comprises integrating the at least one recorded voice prompt into the interactive voice response application.

12. The method of claim 9, wherein the customer responses comprise verbal responses, and wherein the interpreting step comprises interpreting the verbal responses using voice recognition techniques.

13. The method of claim 9, wherein the customer responses comprise pushing keys of a keypad of a customer's telephone, and wherein the interpreting step comprises interpreting DTMF tones generated by the customer's telephone.

14. The method of claim 9, wherein the customer responses comprise pushing keys of a keyboard of a customer's computer or selecting an option using a pointing device of the customer's computer.

15. The method of claim 14, wherein the receiving step comprises receiving response signals generated by the customer's computer via a communications network.

16. A computer readable medium storing a set of instructions, wherein the instructions enable a computer to perform a plurality of program steps as a first interactive voice response application, comprising:

posing a series of questions to a customer with an automated interrogation system;

receiving the customer's responses to the series of questions;

interpreting the customer's responses; and generating a new interactive voice response application based on the customer responses.

* * * * *

UNITED STATES PATENT AND TRADEMARK OFFICE
CERTIFICATE OF CORRECTION

PATENT NO. : 6,718,017 B1
DATED : April 6, 2004
INVENTOR(S) : Nicholas K. Unger et al.

It is certified that error appears in the above-identified patent and that said Letters Patent is hereby corrected as shown below:

Column 11,
Line 12, please delete "herein" and replace with -- wherein --
Line 25, please delete "customer" and replace with -- customer's --

Signed and Sealed this

Twenty-second Day of June, 2004

JON W. DUDAS
*Acting Director of the United States Patent and Trademark Office*